(12) United States Patent
Charnesky et al.

(10) Patent No.: US 8,807,166 B2
(45) Date of Patent: Aug. 19, 2014

(54) ACTIVE AERO SHUTTERS

(75) Inventors: Scott P. Charnesky, Birmingham, MI (US); Nilesh D. Mankame, Ann Arbor, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 328 days.

(21) Appl. No.: 13/152,323

(22) Filed: Jun. 3, 2011

(65) Prior Publication Data
US 2012/0305818 A1 Dec. 6, 2012

(51) Int. Cl.
*F24F 13/08* (2006.01)
(52) U.S. Cl.
USPC ............ 137/601.08; 137/601.14; 137/601.15; 251/285; 251/249; 454/319; 454/335
(58) Field of Classification Search
USPC ............ 137/601.08, 599.01, 599.03, 599.06, 137/599.07, 601.14, 601.15; 251/285, 249; 454/268, 318, 319, 320, 335, 239, 256, 454/153
See application file for complete search history.

(56) References Cited

U.S. PATENT DOCUMENTS

| | | | | |
|---|---|---|---|---|
| 1,065,023 A | * | 6/1913 | Blood | 137/518 |
| 1,157,541 A | * | 10/1915 | Huskinsson | 261/62 |
| 1,488,345 A | * | 3/1924 | Jenkins | 49/2 |
| 2,616,356 A | * | 11/1952 | Cunningham | 454/259 |
| 2,926,400 A | * | 3/1960 | Mandel | 49/87.1 |
| 2,965,014 A | * | 12/1960 | Lowery | 454/256 |
| 2,974,680 A | * | 3/1961 | Kreuttner | 137/595 |
| 2,976,884 A | * | 3/1961 | Kurth et al. | 137/606 |
| 2,997,939 A | * | 8/1961 | Snyder et al. | 49/87.1 |
| 3,182,579 A | * | 5/1965 | Wiseman | 454/320 |
| 3,228,318 A | * | 1/1966 | Wheatley | 49/91.1 |
| 3,298,658 A | * | 1/1967 | Alyea | 251/11 |
| 3,443,588 A | * | 5/1969 | Banko | 137/601.08 |
| 3,484,990 A | * | 12/1969 | Elliot et al. | 49/91.1 |
| 3,653,317 A | * | 4/1972 | Costanzo, Jr. | 454/319 |
| 3,889,552 A | * | 6/1975 | McGough, Jr. | 74/519 |
| 3,901,275 A | * | 8/1975 | Logsdon | 137/599.03 |
| 4,191,212 A | * | 3/1980 | Hagar | 137/601.09 |
| 4,263,842 A | * | 4/1981 | Moore | 454/318 |
| 4,469,132 A | * | 9/1984 | Redington | 137/601.06 |
| 5,129,859 A | * | 7/1992 | Yagi | 454/155 |
| 5,425,673 A | * | 6/1995 | Mahlanen et al. | 454/369 |
| 5,730,652 A | * | 3/1998 | Van Becelaere | 454/335 |
| 5,878,806 A | * | 3/1999 | Denk et al. | 165/42 |
| 6,029,698 A | * | 2/2000 | Murray et al. | 137/601.01 |
| 7,296,595 B2 | * | 11/2007 | Santinanavat et al. | 137/614.19 |
| 2003/0106592 A1 | * | 6/2003 | Zelczer | 137/601.13 |

* cited by examiner

*Primary Examiner* — Eric Keasel
*Assistant Examiner* — David Colon Morales
(74) *Attorney, Agent, or Firm* — Quinn Law Group, PLLC

(57) ABSTRACT

A shutter set includes a first vane and a first vane stop. The first vane is moveable between a first position and a second position. The first vane stop is selectively moveable between a locking position and a free position, relative to the first vane. The first vane stop is configured to apply a bias force or is configured to bias the first vane by a predetermined clearance distance when the first vane stop is in the locking position, and is configured to allow movement of the first vane between the first position and the second position when the first vane stop is in the free position.

15 Claims, 6 Drawing Sheets

ACTIVE AERO SHUTTERS

TECHNICAL FIELD

This disclosure relates to variable-flow shutter or louver systems for vehicles.

BACKGROUND

Vehicles may use airflow to cool components within an engine compartment, including the engine or transmission. Airflow may also be directed to the passenger compartment, for combustion, or for other uses. Other components may be cooled directly or indirectly with airflow, including brakes, electronics, motors, et cetera. However, the components and systems utilizing airflow may not always require the full amount of airflow available to the vehicle. Variable airflow components may be used to selectively open or close airflow passages, holes, or ducts.

SUMMARY

A shutter set is provided. The shutter set includes, at least, a first vane and a first vane stop. The first vane is moveable between a first position and a second position. The first vane stop is selectively moveable, relative to the first vane, between a locking position and a free position.

The first vane stop is configured to bias the first vane by a predetermined clearance distance when the first vane stop is in the locking position. Alternatively, the first vane stop may be configured to apply a bias force to the first vane when the first vane stop is in the locking position. The first vane stop is configured to allow movement of the first vane between the first position and the second position when the first vane stop is in the free position.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
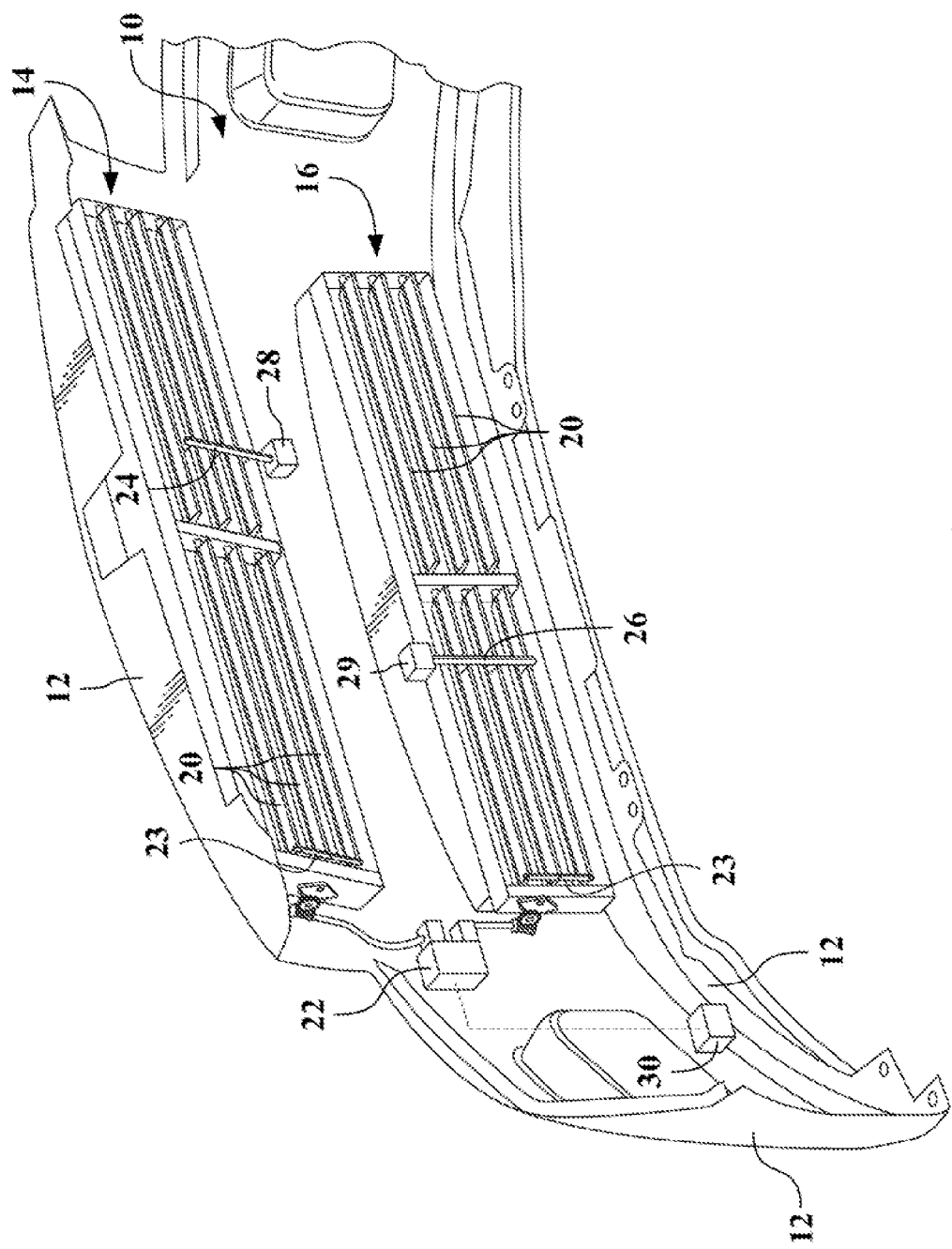
FIG. 1 is a schematic isometric view of a front fascia and grille system with variable-airflow shutter or louver sets.

Referring to the drawings, wherein like reference numbers correspond to like or similar components whenever possible throughout the several figures, there is shown in FIG. 1 a schematic diagram of a grille system 10 for a vehicle (only portions of which are shown). FIG. 1 shows an isometric view of some of the primary components of the grille system 10, which is located within a front fascia 12. The grille system 10 may be placed in other locations of the vehicle and the specific location shown is not limiting. Features and components shown in other figures may be incorporated and used with those shown in FIG. 1.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The grille system 10 includes a first shutter set 14 and a second shutter set 16, which may be very similar (as shown) or may vary in size, shape, and operation. Selective positioning of the shutter sets 14, 16 alters the flow of air past the grille system 10 and to various components of the vehicle which utilize that airflow, including engines, motors, or radiators (none of which are shown). Although the shutter sets 14, 16 and the grille system 10 are shown on the front fascia 12, the components may be placed in other locations of the vehicle and the specific locations shown and described are not limiting.

Each of the shutter sets 14, 16 includes a plurality of vanes 20, which may also be referred to as individual shutters, louvers, or slats. As used herein, "vane" refers to one of the vanes 20, while "shutter set" refers to groups of the vanes 20 which are operated, actuated, or controlled as a group, such as either of the shutter sets 14, 16 shown in FIG. 1. Those having ordinary skill in the art will recognize other terminology for referring to individual components or groups thereof. The vanes 20 may be identified numerically and any of the vanes 20 of the shutter sets 14, 16 may be referred to as a first, second, third, fourth, or higher number. In the grille system 10 shown in FIG. 1, each of the shutter sets 14, 16 includes six vanes 20.

The vanes 20 of the shutter sets 14, 16 may be mounted directly to portions of the front fascia 12. Alternatively, the vanes 20 may be mounted to frame members (not separately identified) that are attached to the front fascia 12, or other structure.

A position actuator 22 is shown schematically in FIG. 1, and is operatively attached to the vanes 20 of the first shutter set 14 and to the vanes 20 of the second shutter set 16. The vanes 20 of each of the shutter sets 14, 16 are configured to be moveable between at least a first position and a second position, but may be configured for additional positions.

The shutter sets 14, 16 may be configured with an open position, which is configured to allow maximum airflow though the shutter sets 14, 16, such as the position shown in FIG. 1. The shutter sets 14, 16 may be configured with a closed position, which is configured to substantially block airflow through the shutter sets 14, 16. In the closed position, the vanes 20 of FIG. 1 would be rotated by approximately ninety degrees and would form a closed wall through which little air would flow in most conditions.

The position actuator 22 and the shutter sets 14, 16 may also be configured to place the vanes 20 in one or more intermediate positions. The intermediate positions may be configures to allow partial airflow, such that the shutter sets 14, 16 are neither fully open nor fully closed. The position actuator 22 and the shutter sets 14, 16 may further be configured with many intermediate positions, such that the vanes 20 may be placed in nearly an infinite number of positions between, and inclusive of, the open and closed positions. The open position, the closed position, or any of the intermediate positions may be referred to as the first position, the second position, or another position.

The position actuator 22 may be configured for compound or non-sequential control of the shutter sets 14, 16, such that the position of the vanes 20 in the first shutter set 14 may be controlled completely independently from the position of the vanes 20 in the second shutter set 16. Additional position actuators 22 may also be included such that each of the shutter sets 14, 16 is controlled by its own, dedicated position actuator 22. The grille system 10 shown in FIG. 1 is configured for compound control over the shutter sets 14, 16. Alternatively, the position actuator 22 may be configured for linked control, such that the positions of the vanes 20 in the first shutter set 14 are linked or related to the positions of the vanes 20 in the second shutter set 16.

The vanes 20 within either the first shutter set 14 or the second shutter set 16 may be operatively connected by one or more links 23, such that only one vane 20 needs to be driven between positions by the position actuator 22. Alternatively, the position actuator 20 may act directly on the link 23 to move all of the vanes 20 in one of the shutter sets 14, 16.

Many components are manufactured with design clearances to account for the results of manufacturing variability. For example, the mounting interfaces between the vanes 20 and the front fascia 12, or between the vanes 20 and the links 23, may be designed with larger holes or slots than would be necessary if no manufacturing variability were expected or possible. Therefore, if the vanes 20 are slightly too large or the mounted holes are slightly too small, the vanes 20 will still be moveable by the position actuator 22 without interference. The design clearances may be determined, for example, by testing or through engineering design methods, and may be implemented as a predetermined clearance distance.

The grille system 10 includes a first vane stop 24 which is operatively attached to, or configured to come into contact with, the vanes 20 of the first shutter set 14. The grille system 10 also includes a second vane stop 26 which is operatively attached to, or configured to come into contact with, the vanes 20 of the second shutter set 16. By moving the vanes 20 by the predetermined clearance distance, the amount of travel available—due to manufacturing variability and designed clearances—between the vanes 20 and the mounting structure or the links 23 may be reduced. Therefore, the availability of vibration and rattle in the vanes 20 may also be reduced.

A first vane stop actuator 28 is configured to move the first vane stop 24 between at least a locking position and a free position, and a second vane stop actuator 29 is configured to move the second vane stop 26 between at least the locking position and the free position. When placed in the locking position by the first vane stop actuator 28, the first vane stop 24 biases the vanes 20 of the first shutter set 14 by the predetermined clearance distance. However, when the first vane stop 24 is in the free position, the vanes 20 of the first shutter set 14 are not biased by the first vane stop 24 and can move through the joint clearances in the assembly. This motion can lead to vibration which produces undesirable noise and may reduce the life of the components.

Similarly, the second vane stop 26 biases the vanes 20 of the second shutter set 16 by the predetermined clearance distance when the first vane stop actuator 28 places the second vane stop 26 in the locked position, and allows the vanes to be driven when in the open position. The first vane stop 24 and the second vane stop 26 may be moveable independently from each other. Alternatively, as described herein, movement of the first vane stop 24 and the second vane stop 26 may be linked to one or more position actuators 22.

Movement through the predetermined clearance distance between the locking position and the free position may occur regardless of the positioning of the vanes 20, such that the vanes 20 may be in the open position, closed position, or any intermediate position. The predetermined clearance distance is estimated or calculated, and may not represent an actual clearance or gap in the produced components. Furthermore, the actual distance between components may be greater than the predetermined clearance distance, because manufacturing variance may be multi-directional.

Therefore, the first vane stop 24 and the second vane stop 26 are configured to selectively bias the vanes 20 by the predetermined clearance distance. In this respect, "bias" refers to the attempt to move the vanes 20 by the predetermined clearance distance. In actuality, depending upon the actual manufactured state of the components, the clearance gap may be smaller. Therefore, the actual clearance distance in the manufactured vanes 20 may close sooner than expected, and the vanes 20 may stop moving before the predetermined clearance distance has been traversed.

Alternatively stated, the first vane stop 24 and the second vane stop 26 are configured to apply a bias force. Where the bias force is the amount of force—or torque, in rotating systems—sufficient to move the vanes 20 by the predetermined clearance distance, if possible. When the first vane stop 24 or the second vane stop 26 is moved into the locking position, the bias force is applied to the vanes 20, such that the vanes 20 are biased through any clearances less than the clearance distance and make contact with support structure.

The diagram of FIG. 1 includes a highly-schematic controller or control system 30. The control system 30 may include one or more components (not separately shown) with a storage medium and a suitable amount of programmable memory, which are capable of storing and executing one or more algorithms or methods to effect control of the grille system 10 and other components of the vehicle.

The control system 30 is in communication with, and operates, the position actuator 22, the first vane stop actuator 28, and the second vane stop actuator 29. Data gathered from one or more sensors that determine the current state of the system (the position of the vanes 20, the ambient temperature, the coolant temperature, the fan duty cycle, the NVH signature, et cetera) is used in conjunction with programmed logic that resides in the control system 30 to determine the next configuration of the system.

Each component of the control system 30 may include distributed controller architecture, such as a microprocessor-based electronic control unit (ECU). Additional modules or processors may be present within the control system 30. The control system 30 may be incorporated into an engine or powertrain controller or into a hybrid control processor (HCP), when the vehicle is a hybrid or hybrid-electric vehicle.

Figure 2A:
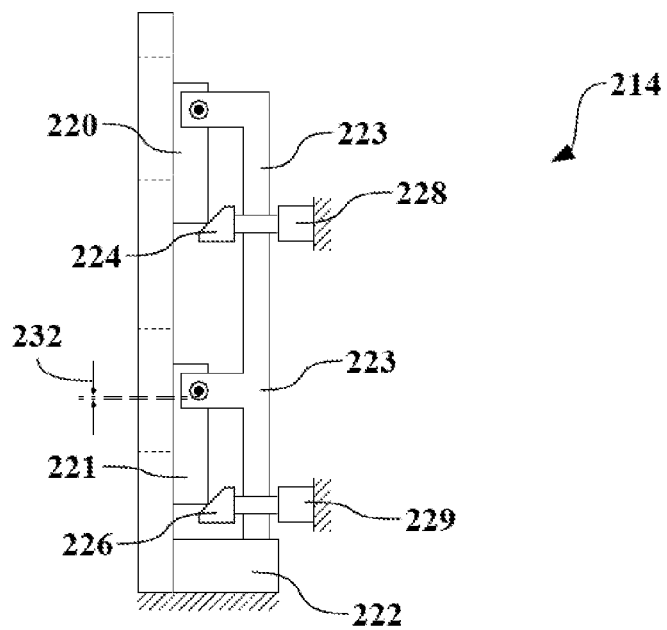
FIG. 2A is a schematic side view of a linear shutter set having two linked vanes and a sliding-frictional vane stop.
Figure 2B:
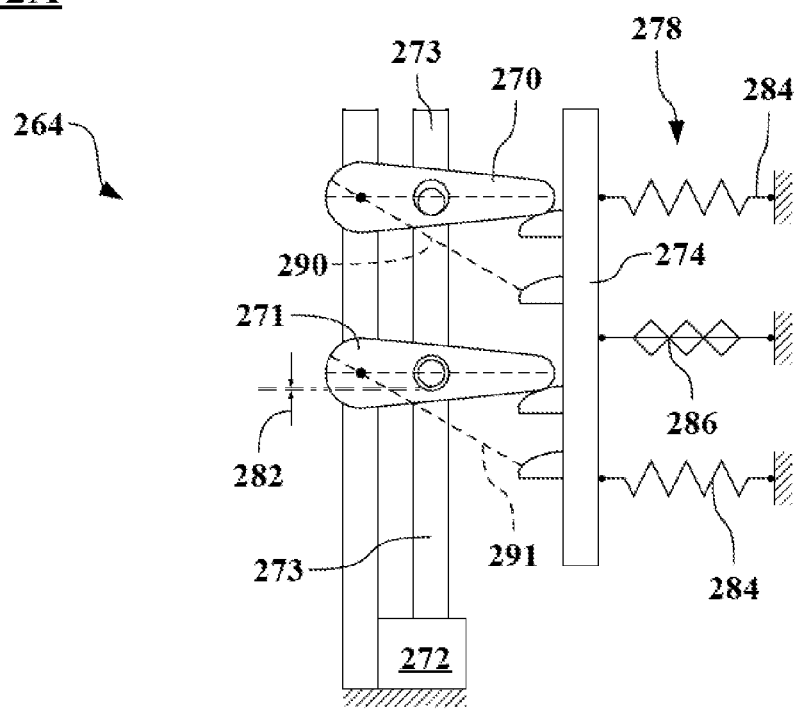
FIG. 2B is schematic side view of a rotational shutter set having two linked vanes and a sliding-frictional vane stop.

Referring now to FIG. 2A and to FIG. 2B, and with continued reference to FIG. 1, linear and rotational examples of shutter sets or louver systems with frictional stops or brakes are shown. FIG. 2A shows a linear shutter set 214 selectively allowing airflow through holes in a housing 218 based upon the position of a first vane 220 and a second vane 221. FIG. 2B shows a rotational shutter set 264 selectively allowing airflow based upon the position of a first vane 270 and a second vane 271. Features and components shown in other figures may be incorporated and used with those shown in FIGS. 2A and 2B.

The linear shutter set 214 shown in FIG. 2A includes a position actuator 222, which drives the first vane 220 and the second vane 221 through a link 223. The position actuator 222 may be a motor, a solenoid, or another actuator capable of positioning driving the link 223 to position the first vane 220 and the second vane 221 to one of an open, closed, or intermediate position. Alternatively, the position actuator may be operatively connected to, and configured to directly drive, only one of the first vane 220 and the second vane 221, and the link 223 may then be used to connect the first vane 220 and the second vane 221. Therefore, movement of either one of the first vane 220 and the second vane 221 also causes movement of the other.

To account for manufacturing variability, the interfaces between the link 223 and each of the first vane 220 and the second vane 221 may be oversized by a predetermined clearance distance 232. The predetermined clearance distance 232 shown schematically in FIG. 2A may be exaggerated for illustrative purposes.

A first vane stop 224 acts on the first vane 220 and is configured to bias the first vane 220 by the predetermined clearance distance 232. A second vane stop 226 acts on the second vane 221 and is configured to bias the second vane 221 by the predetermined clearance distance 232. When pressed against the first vane 220 and the second vane 221, the first vane stop 224 and second vane stop 226 apply a force and create friction which limits movement of the first vane 220 and the second vane 221. The first vane stop 224 and second vane stop 226 may be formed from, for example and without limitation, rubber or plastic.

Biasing the first vane 220 and the second vane 221 upward (as viewed in FIG. 2A) by the predetermined clearance distance 232 may cause the link 223 to come into contact with either or both of the first vane 220 and the second vane 221. Therefore, the opportunity for the first vane 220 and the second vane 221 to rattle or vibrate may be reduced considerably.

The direction of bias is not limiting, and the first vane stop 224 and second vane stop 226 may be configured to bias the first vane 220 and the second vane 221 downward (as viewed in FIG. 2A). Alternatively, because the first vane 220 and the second vane 221 are connected by the link 223, the linear shutter set 214 may be configured with only one of the first vane stop 224 and the second vane stop 226. Overcoming the predetermined clearance distance 232 on only one of the first vane 220 and the second vane 221 may also reduce the opportunity for the first vane 220 and the second vane 221 to rattle or vibrate.

The first vane stop 224 and the second vane stop 226 are actuated by a first vane stop actuator 228 and a second vane stop actuator 229, respectively. The first vane stop actuator 228 and the second vane stop actuator 229 selectively move the first vane stop 224 and the second vane stop 226 between a locking position (shown in FIG. 2A) and a free position (retracted to the right, as viewed in FIG. 2A) that allows easier positioning of the first vane 220 and the second vane 221. The first vane stop actuator 228 and the second vane stop actuator 229 may be, for example and without limitation, solenoids or linear motors.

The rotational shutter set 264 shown in FIG. 2B includes a position actuator 272, which drives the first vane 270 and the second vane 271 through a link 273. The position actuator 272 may be a motor, a solenoid, or another actuator capable of positioning driving the link 273 to position the first vane 270 and the second vane 271 to one of an open, closed, or intermediate position. Alternatively, the rotational shutter set 264 may be configured such that the position actuator 272 acts only on the first vane 270 (a primary vane) and the second vane 271 (a secondary vane) is moved sympathetically through the link 273 or another connection means (not shown).

The rotational shutter set 264 is shown in a substantially-open position, but the alignment of the first vane 270 and the second vane 271 in a different, intermediate position is shown as phantom lines 290 and 291, respectively. The fully closed position rotates the first vane 270 and the second vane 271 either clockwise or counterclockwise to a substantially-vertical orientation (as viewed in FIG. 2B).

To account for manufacturing variability, the interfaces between the link 273 and each of the first vane 270 and the second vane 271 may be oversized by a predetermined clearance distance 282. The predetermined clearance distance 282 shown schematically in FIG. 2B may be exaggerated for illustrative purposes.

A vane stop 274 acts on the first vane 270 and the second vane 271 and is configured to bias the first vane 270 and the second vane 271 by the predetermined clearance distance 282. When pressed against the first vane 270 and the second vane 271, the vane stop 274 applies the bias force and creates friction which limits movement of the first vane 270 and the second vane 271. The vane stop 274 may be formed from, or coated with, for example and without limitation, rubber or plastic.

Biasing the first vane 270 and the second vane 271 upward causes counterclockwise rotation (as viewed in FIG. 2B) by the predetermined clearance distance 282 may cause the link 273 to come into contact with either or both of the first vane 270 and the second vane 271. Therefore, the opportunity for the first vane 270 and the second vane 271 to rattle or vibrate may be reduced considerably.

The direction of bias is not limiting, and the vane stop 274 may be configured to bias the first vane 270 and the second vane 271 downward and cause clockwise rotation (as viewed in FIG. 2B). Alternatively, because the first vane 270 and the second vane 271 are connected by the link 273, the rotational shutter set 264 may be configured with the vane stop 274 working on only one of the first vane 270 and the second vane 271. Overcoming the predetermined clearance distance 282 on only one of the first vane 270 and the second vane 271 may also reduce the opportunity for rattle or vibration.

The vane stop 274 is actuated by a vane stop actuator 278. The vane stop actuator 278 selectively moves the vane stop 274 between a locking position (shown in FIG. 2B) and a free position (refracted to the right, as viewed in FIG. 2B) that allows easier positioning of the first vane 270 and the second vane 271.

The vane stop actuator 278 may be, for example and without limitation, solenoids or linear motors configured to move the vane stop 274 between the locking and free positions. However, the vane stop actuator 278 shown in FIG. 2B includes a pair of biasing springs 284 and an active material actuator 286. In operation of the vane stop actuator 278, the biasing springs 284 bias the vane stop 274 leftward (as viewed in FIG. 2B) into the locking position. To place the vane stop 274 in the free position and allow the first vane 270 and the second vane 271 to move freely, the active material actuator 286 is triggered and pulls the vane stop 274 rightward (as viewed in FIG. 2B) away from the first vane 270 and the second vane 271.

The active material actuator 286 may be, for example and without limitation, a shape memory alloy (SMA) wire or spring. In such a configuration, passing an electric current through the active material actuator 286 causes contraction of the SMA wire or spring, providing a counter force to the biasing springs 284. The opposite configuration may also be used, such that the biasing springs 284 bias the vane stop 274 rightward to the free position and the active material actuator 286 moves the vane stop 274 leftward to the locking position.

Figure 3:
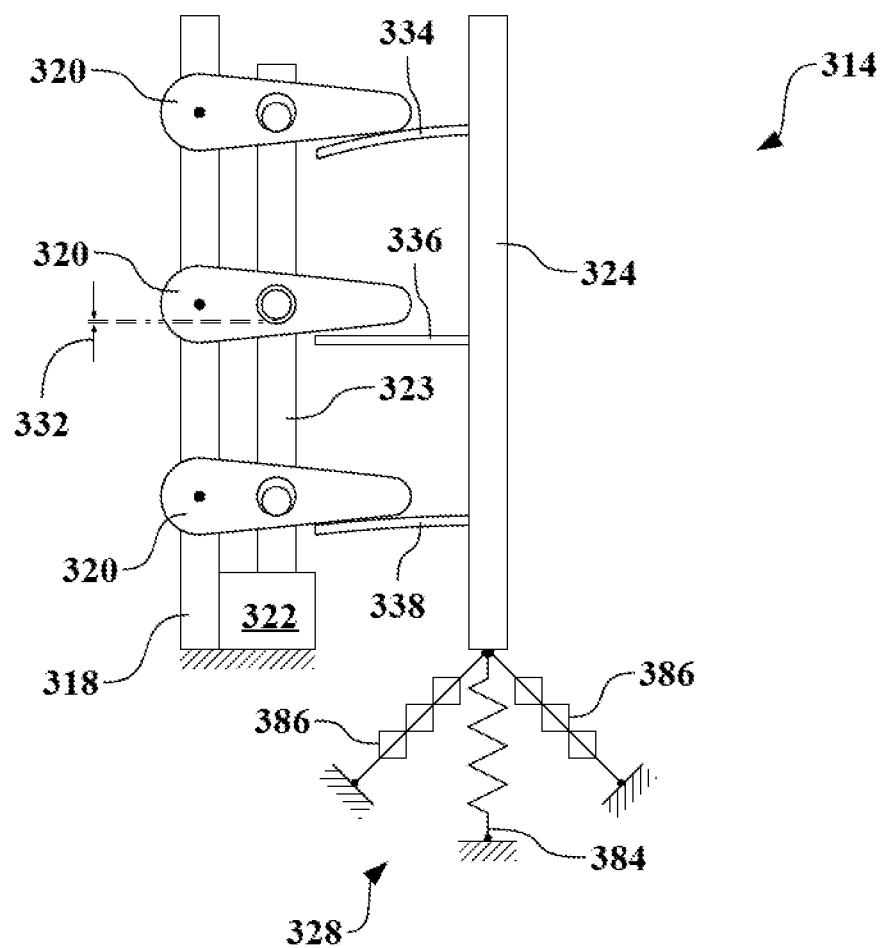
FIG. 3 is a schematic side view of a shutter set, similar to those shown in FIG. 1, having a dedicated actuator with flexible connectors.

Referring now to FIG. 3, and with continued reference to FIGS. 1, 2A and 2B, there is shown a shutter set 314 selectively allowing airflow through holes in a housing 318 based upon the position of a plurality of vanes 320. Features and components shown in other figures may be incorporated and used with those shown in FIG. 3.

The shutter set 314 shown in FIG. 3 includes a position actuator 322, which drives the vanes 320 through a link 323. The position actuator 322 may be a motor, a solenoid, or another actuator capable of positioning driving the link 323 to position the vanes 320 to one of an open, closed, or intermediate position. The position actuator 322 may also be configured to act on only one of the vanes 320 (the primary vane), such that movement of the other vanes 320 (the secondary vanes) occurs as a result of connection through the link 323.

To account for manufacturing variability, the interfaces between the link 323 and each of the vanes 320 may be oversized by a predetermined clearance distance 332. The predetermined clearance distance 332 shown schematically in FIG. 3 may be exaggerated for illustrative purposes. As described herein, the shutter set 314 is shown with vane stop 324 already trying to bias the vanes 320 to close the clearance distance 332.

A vane stop 324 acts on the vanes 320 and is configured to bias the vanes 320 by the predetermined clearance distance 332 through a first flexible connector 334, a second flexible connector 336, and a third flexible connector 338. The flexible connectors 334, 336, 338 are configured to bias the vanes 320 by the predetermined clearance distance 332, if possible, when the vane stop 324 is in the locking position.

When pressed against the vanes 320, the flexible connectors 334, 336, 338, apply the bias force to the vanes 320 when, and if, contact is made between the flexible connectors 334, 336, 338 and the adjacent vanes 320. The flexible connectors 334, 336, 338 may be formed from, or coated with, for example and without limitation, rubber or plastic. Depending upon the shape and configuration of the flexible connectors 334, 336, 338, they may also create frictional force to limit movement of the vanes 320.

Biasing the vanes 320 upward causes counterclockwise rotation (as viewed in FIG. 3) about the vane pivots (not numbered) that is limited by the predetermined clearance distance 332 and may cause the link 323 to come into contact with one or more of the vanes 320. Therefore, the opportunity for the vanes 320 to rattle or vibrate may be reduced considerably. The flexible connectors 334, 336, 338 allow for increased manufacturing variability between the vane stop 324, the link 323, and the individual vanes 320.

Note that although only the joints between the link 323 and the vanes 320 are shown to have clearances in FIG. 3, all of the joints in the shutter set 314 (for example, the pivots between the vanes 320 and the housing 318) may have clearances. The action of the vane stop 324 is such that it strives to reduce or eliminate all of these clearances, to increase the stiffness of the shutter set 314, and to increase frictional resistance to motion within the shutter set 314 while the vane stop 324 is in the locked position. The vane stop 324 thus mitigates the causes of vibration, noise and harshness in the system.

When the vane stop 324 is in the unlocked position, the inherent elasticity of the components of the shutter set 314 may restore some or all of the clearances and thereby reduce the stiffness of the system as well as the frictional resistance to the relative motion of its components. This allows the vanes 320 to be repositioned with relative ease when the vane stop 324 is in the unlocked position.

As shown in FIG. 3, due to manufacturing variability, the vanes 320 were moved differing amounts by the flexible connectors 334, 336, 338. The first flexible connector 334 is greatly flexed because the adjacent (upper, as viewed in FIG. 3) vane 320 was already in contact with the link 323. The second flexible connector 336 is not flexed at all because the second flexible connector 336 was further away from the adjacent vane 320 than the clearance distance 332, and there remains a gap between the adjacent (middle, as viewed in FIG. 3) vane 320 and the link 323. The third flexible connector 338 has partially flexed and closed the clearance gap 332 between the adjacent (lower, as viewed in FIG. 3) vane 320 and the link 323.

Therefore, one of the vanes 320 in FIG. 3 may be free to move or vibrate while the other two are biased against the link 323. Alternatively, the vane stop 324 may move one or more of the vanes 320 by the clearance distance but that may be insufficient to close the actual gap between the vane 320 and the link 323. The clearance distance 332 may be chosen such that all of the vanes 320 are likely to be biased against the link 323, thereby mitigating the noise, vibration, and harshness impact of the joint clearances.

The vane stop 324 is actuated by a vane stop actuator 328. The vane stop actuator 328 selectively moves the vane stop 324 between a locking position (shown in FIG. 3) and a free position (retracted downward, as viewed in FIG. 3) that allows easier positioning and movement of the vanes 320.

The vane stop actuator 328 may be, for example and without limitation, solenoids or linear motors configured to move the vane stop 324 between the locking and free positions. However, the vane stop actuator 328 shown in FIG. 3 includes a biasing spring 384 and a pair of active material actuators 386. In operation of the vane stop actuator 328, the biasing spring 384 biases the vane stop 324 upward (as viewed in FIG. 3) into the locking position. To place the vane stop 324 in the free position and allow the vanes 320 to move freely, the active material actuators 386 are triggered and pull the vane stop 324 downward (as viewed in FIG. 3) away from the vanes 320.

The active material actuators 386 may be, for example and without limitation, SMA wires or springs. In such a configuration, passing an electric current through the active material actuators 386 causes contraction of the SMA wires or springs, providing a counter force to the biasing springs 384.

Depending upon the configuration of the shutter set 314, the vane stop 324 may be located such that the flexible connectors 334, 336, 338 contact the vanes 320 nearer to the pivots, so that the moment—the anti-rattle force multiplied by the distance from the pivots—exerted by the flexible connectors 334, 336, 338 about the pivot is small. The moment generated by actuation of the vane stop 324 may be resisted by the position actuator 322 and any transmission attached thereto. Large changes in orientation of the vanes 320 produced by high moments from the flexible connectors 334, 336, 338 can undermine the action of the position actuator 322 and the position commanded by the controller.

Figure 4:
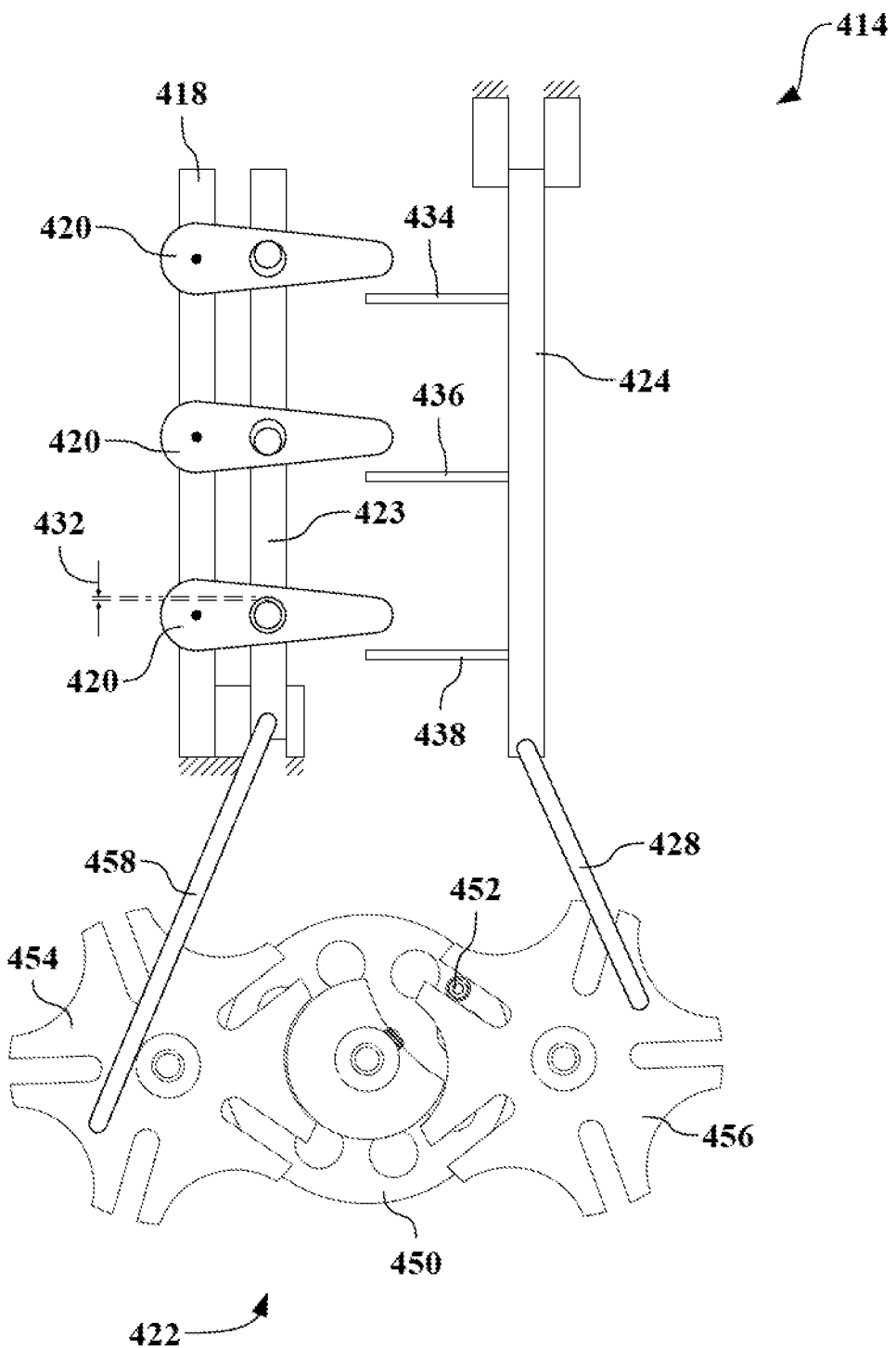
FIG. 4 is a schematic side view of a shutter set, similar to those shown in FIG. 1, having a single actuator positioning both a vane set and a vane stop through a Geneva mechanism.

Referring now to FIG. 4, and with continued reference to FIGS. 1-3, there is shown a shutter set 414 selectively allowing airflow through a housing 418 based upon the position of a plurality of vanes 420. Features and components shown in other figures may be incorporated and used with those shown in FIG. 4.

The shutter set 414 shown in FIG. 4 includes a dual actuator 422, which drives the vanes 420 through a vane link 423. The dual actuator 422 may be referred to as a Geneva mechanism, Geneva drive, or Geneva wheel. As described herein, the dual actuator 422 also drives a vane stop 424. The dual actuator 422 may include a motor, a solenoid, or another actuator capable of driving the vane link 423 to position the vanes 420 to one of an open, closed, or intermediate position, and also capable of driving the vane stop 424 between a locked position and a free position.

In addition to the configuration shown, the dual actuator may include a transmission (not shown) configured to split power input from a single actuator, such as a motor (not shown), between the vane link 423 and the vane stop 424. Therefore, the single actuator would use the transmission to drive two or more components from one input power source.

To account for manufacturing variability, the interfaces between the vane link 423 and each of the vanes 420 may be oversized by a predetermined clearance distance 432. The predetermined clearance distance 432 shown schematically in FIG. 4 may be exaggerated for illustrative purposes. As described herein, the shutter set 414 is shown with vane stop 424 already trying to bias the vanes 420 to close the clearance distance 432.

A vane stop 424 acts on the vanes 420 and is configured to bias the vanes 420 by the predetermined clearance distance 432 through a first flexible connector 434, a second flexible connector 436, and a third flexible connector 438. The flexible connectors 434, 436, 438 are configured to bias the vanes 420 by the predetermined clearance distance 432, if possible, when the vane stop 424 is placed in the locking position.

When pressed against the vanes 420, the flexible connectors 434, 436, 438, apply a force to the vanes 420 when, and if, contact is made between the flexible connectors 434, 436, 438 and the adjacent vanes 420. The flexible connectors 434, 436, 438 may be formed from, or coated with, for example and without limitation, rubber or plastic. Depending upon the shape and configuration of the flexible connectors 434, 436, 438, they may also create frictional force to limit movement of the vanes 420.

Biasing the vanes 420 upward causes counterclockwise rotation (as viewed in FIG. 4) and may cause the vane link 423 to come into contact with one or more of the vanes 420 by closing the predetermined clearance distance 432. Therefore, the opportunity for the vanes 420 to rattle or vibrate may be reduced considerably. The flexible connectors 434, 436, 438 allow for increased manufacturing variability between the vane stop 424, the vane link 423, and the individual vanes 420. As shown in FIG. 4, due to manufacturing variability, the vanes 420 will need to be moved differing amounts by the flexible connectors 434, 436, 438.

The vane stop 424 is actuated by a vane stop link 428, which is actuated by the dual actuator 422. The vane stop link 428 moves the vane stop 424 between a locking position (moved upward, as viewed in FIG. 4) and a free position (shown in FIG. 4) that allows easier positioning and movement of the vanes 420.

The dual actuator 422 selectively drives both the vane link 423 and the vane stop link 428. The dual actuator 422 includes a drive wheel 450, a pin 452, and two driven Geneva wheels: a vane wheel 454 and a stop wheel 456. As the drive wheel 45° rotates clockwise, the pin 452 first engages one of the slots of the vane wheel 454, causing counterclockwise rotation thereof.

The drive wheel 450 may be driven by, for example and without limitation: a motor, a linear motor, or a step motor. Regardless of the component powering movement of the drive wheel 450, the single drive wheel 450 drives movement and position of both the vanes 420 and the vane stop 424. The linkages, connections, direction of rotation, and orientation of the dual actuator 422 shown in FIG. 4 is illustrative only, and the shutter set 414 may utilize other configurations to position and lock the vanes 420 from a single actuator.

The vane wheel 454 pushes a connector 458 that is connected to the vane link 423. The vane link 423 is moved upward (as viewed in FIG. 4) to position the vanes 420, which are shown in a substantially open position. The vane link 423 moves as a result of movement by the drive wheel 450 until the pin 452 disengages from the slot in the vane wheel 454. After this point, the vanes 420 are positioned and the pin 452 is no longer interacting with the vane wheel 454, as shown in FIG. 4. However, the vanes 420 are free to move a slight amount due to the clearance distance 432 designed into the shutter set 414 to overcome manufacturing variability.

The drive wheel 450 continues rotating clockwise until the pin 452 engages with a slot on the stop wheel 456, which causes counterclockwise rotation of the stop wheel 456. FIG. 4 shows the dual actuator 422 just after the pin 452 has engaged with the stop wheel 456.

The stop wheel 456 moves the vane stop link 428, which causes the vane stop 424 to move upward (as viewed in FIG. 4). The vane stop 424 moves the flexible connectors 434, 436, 438 into contact with adjacent vanes 420, if possible. When the flexible connectors 434, 436, 438 make contact, the vanes 420 are rotated counterclockwise and may close the clearance gap 432 between the vane link 423 and some, or all, of the vanes 420. If the drive wheel 450 continues rotating clockwise after the vane stop 424 is in the locked position, the pin 452 will disengage from the slot in the stop wheel 456 and stop movement of the stop wheel 456.

Due to the Geneva mechanism of the dual actuator 422, the vane wheel 454 and the stop wheel 456 rotate only when the pin 452 is engaged in a slot of the respective wheel. At all other times, the vane wheel 454 and the stop wheel 456 maintain the last position attained when they were driven by the pin 452 moving in one of their slots. Therefore, when the vane stop 424 is being repositioned, the vanes 420 are held stationary. For a portion of the rotation of the drive wheel 450 between the positions where the pin 452 engages either the vane wheel 454 or the stop wheel 456, the pin 452 is not engaged with either wheel. During such rotation, both the vanes 420 and the vane stop 424 are held substantially in a fixed position. Configuration of the dual actuator 422 and the shutter set 414 may alter the relative location of the vane wheel 454 and the stop wheel 456 to alter the amount, if any, of non-contact rotation during operation.

Reversal of the drive wheel 450—rotation in the counterclockwise direction, as viewed in FIG. 4—causes the stop wheel 456 to retract the vane stop 424 back to the free position. The drive wheel 450 then returns the pin 452 to the vane wheel 454 and retracts the connector vane link 423. Retracting the vane link 423 causes the vanes 420, which are now free to move because the vane stop 424 is in the free position, to return to the closed position (approximately ninety degrees or clockwise rotation, as viewed in FIG. 4). The vane stop 424 may also include a bias spring (not shown in FIG. 4) configured to bias the vane stop 424 into the free position.

Figure 5:
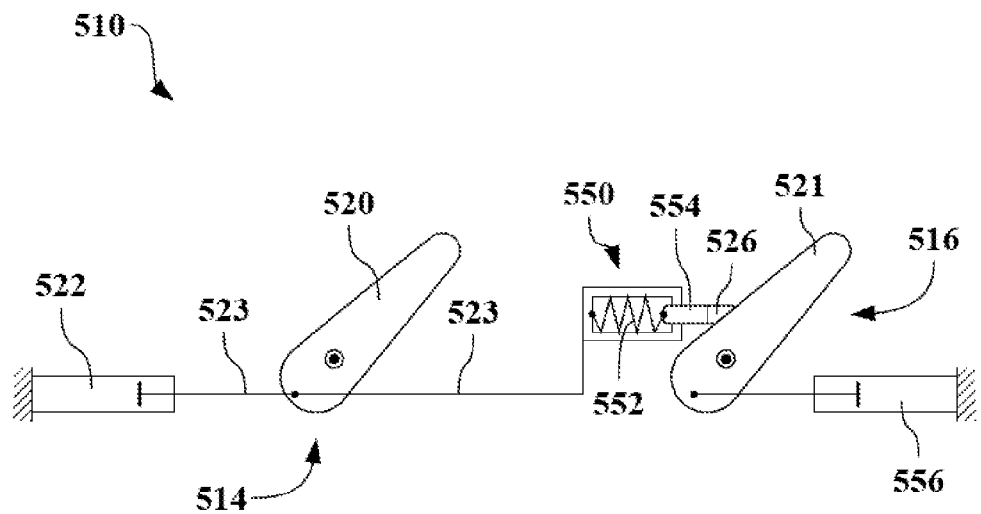
FIG. 5 is a schematic side view of a shutter set having one actuator which positions both a first set of vanes and also a vane stop for a second set of vanes.
Figure 6:
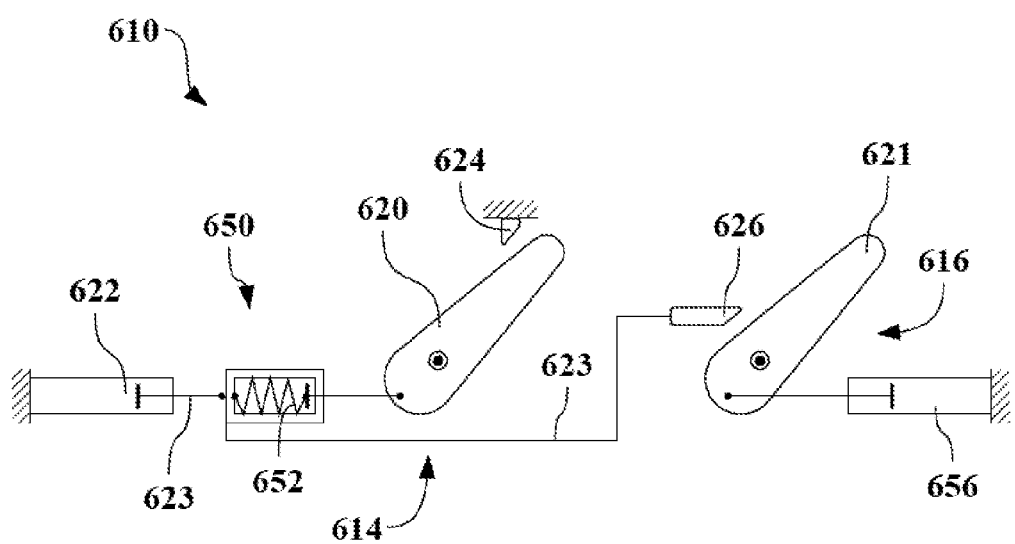
FIG. 6 is a schematic side view of another shutter set having a common actuator which positions both the first set of vanes and also the vane stop for the second set of vanes.

Referring now to FIG. 5 and to FIG. 6, and with continued reference to FIGS. 1-4, there are shown illustrative shutter sets using common actuators to both position one vane set and stop another vane set. FIG. 5 shows a schematic side view of a grille system 510 having a common actuator 522, which moves or positions both a first shutter set 514 and also a second vane stop 526 for a second shutter set 516. FIG. 6 shows a schematic side view of a grille system 610 having a common actuator 622, which moves or positions both a first shutter set 614 and also a second vane stop 626 for a second shutter set 616. Features and components shown in other figures may be incorporated and used with those shown in FIGS. 5 and 6.

The common actuator 522 drives the position of the first shutter set 514 through a link 523. Only one vane element 520 for the first shutter set 514 is shown in FIG. 5. However, the vane element 520 is representative of both the primary vane element 520 and secondary vane elements (not shown, but the vane element 520 may be connected to a whole vane set, such as those shown in FIG. 1). The link 523 may be connected to the secondary vane elements or a secondary link (not shown) may transfer movement from the primary vane to the secondary vanes. Similarly, one vane element 521 is representative of multiple vanes for the second shutter set 516.

The link 523, or another link, directly connects the common actuator 522 to an energy storage mechanism 550. The energy storage mechanism 550 is connected to a second vane stop 526, which is configured to apply force sufficient to move the second shutter set 516 by the predetermined clearance distance, if possible, and therefore limit rattle or vibration in the second shutter set 516.

As used herein, direct connections refer to linkages without energy storage mechanisms, such as springs or other highly-flexible members. Therefore, the common actuator 522 is directly connected to the vane element 520 by the link 523 but is not directly connected to either the vane element 521 or the second vane stop 526.

The energy storage mechanism 550 acts as a flexible coupling between the common actuator 522 and the second vane stop 526. Therefore, the common actuator 522 has a rigid connection to the first shutter set 514 and a compliant connection to the second shutter set 516.

The shutter set 514 is shown in a first position, which may be a substantially-closed position. To further open the shutter set 514, the vane elements 520 and 521 rotate counterclockwise.

The energy storage mechanism 550 includes a spring 552 disposed between the link 523 and a stopper link 554. The stopper link 554 is directly connected to the second vane stop 526. Depending upon the relative position of the link 523 and the stopper link 554, the spring 552 transfers a variable amount of force from the common actuator 522 to the second vane stop 526.

During operation of the grille system 510, the common actuator 522 moves the link 523, which causes the vane element 520 to rotate counterclockwise to a desired second position. The common actuator 522 also moves the energy storage mechanism 550 such that the stopper connection 554 moves the second vane stop 526 either into contact with the second shutter set 516 or increases the force applied by the second vane stop 526 on the second shutter set 516.

A second actuator 556 directly positions the second shutter set 516 through the vane element 521. Therefore, while the common actuator 522 is retracted, the second actuator 556 is free to position the second shutter set 516 with little force applied by the second vane stop 526. However, when the common actuator 522 increases the force delivered to the second vane stop 526, the second shutter set 516 is biased by the second vane stop 526 to close the clearance gap and reduce the likelihood of rattle or vibration in the second shutter set 526.

The energy storage mechanism 550 is shown in FIG. 5 as a linear spring, the spring 552. However, the energy storage mechanism 550 may be, for example and without limitation: a torsion spring acting between a rotating common actuator 522 (such as an electric motor); or an arched, flexible member which flexes with increased force and stores energy through elastic deformation.

Although not shown in FIG. 5, the second actuator 556 may also be configured as a common actuator to both position the second shutter set 516 and also to operate a first vane stop (not shown) for the vane elements 520, 521. Another energy storage mechanism may be disposed between the second actuator 556 and the first vane stop, and configured to operate in substantially the same way as the energy storage mechanism 550 and the common actuator 522.

In another modification of the mechanism shown in FIG. 5, the second actuator 556 may be removed. In such a configuration, the first actuator 522 directly drives the first vane element 520 and the second vane element 521 from the open position to the closed position—moving from one extreme position to the other extreme position with intermediate positions. The first actuator 522 also indirectly (such as through the compliant link of the energy storage mechanism 550) drives the vane stop 526 after the first vane element 520 and the second vane element 521 have reached their full open positions.

FIG. 6 also shows common, or shared, actuation of the position of one shutter set and stoppage of the other shutter set. The common actuator 622 drives the position of the first shutter set 614 through a link 623 and through an energy storage mechanism 650, which is directly connected to the first shutter set 614.

Only one vane element 620 for the first shutter set 614 is shown in FIG. 6. However, the vane element 620 is representative of both the primary vane element 620 and secondary vane elements (not shown, but may be similar to the vane sets shown in FIG. 1). The link 623 may be connected to the secondary vane elements or a secondary link (not shown) may transfer movement from the primary vane to the secondary vanes. Similarly, one vane element 621 is representative of multiple vanes for the second shutter set 616.

The link 623 directly connects the common actuator 622 to the energy storage mechanism 650. The link 623 also directly connects the common actuator 622 to the second vane stop 626.

The shutter set 614 is shown in a first position, which may be a substantially-closed position. To further open the shutter set 614, the vane elements 620 and 621 rotate counterclockwise.

A first vane stop 624 is disposed in the path of rotation of the vane element 620, such that contact with the first vane stop 624 biases the vane element 620 against the force from the common actuator 622 and limits rattle or vibration of the first shutter set 614. The energy storage mechanism 650 is connected to the first shutter set 614 through a spring 652.

The energy storage mechanism 650 acts as a flexible coupling between the common actuator 622 and the first shutter set 614. Therefore, the common actuator 622 has a compliant connection to the first shutter set 614 and a rigid connection to the second shutter set 616. After contacting the first vane stop 624, further movement of the common actuator 622 will not affect the first shutter set 614, but will continue to move the second vane stop 626 toward, or against, the second shutter set 616.

During operation of the grille system 610, the common actuator 622 moves the link 623, which acts through the energy storage mechanism 650 to cause the vane element 620 to rotate counterclockwise to a desired second position. Movement of the vane element 620 may be delayed, depending upon the stiffness of the spring 652.

The common actuator 622 also moves the second vane stop 626 such that it moves toward the vane element 621. Once the second vane stop 626 comes into contact with the vane element 621, the second shutter set 616 experiences bias force applied by the second vane stop 626. If the common actuator 622 has also moved the vane element 620 of the first shutter set 614 into contact with the first vane stop 624, then the first shutter set 614 will also be biased through the clearance distances and have its vibration or rattle limited.

A second actuator 656 directly positions the second shutter set 616 through the vane element 621. Therefore, while the common actuator 622 is retracted, the second actuator 656 is free to position the second shutter set 616 with little force applied by the second vane stop 626. However, when the common actuator 622 moves the second vane stop 626 into contact with the vane element 621, the second shutter set 616 is biased to close the clearance gap and reduce the likelihood of rattle or vibration in the second shutter set 626.

Figure 7:
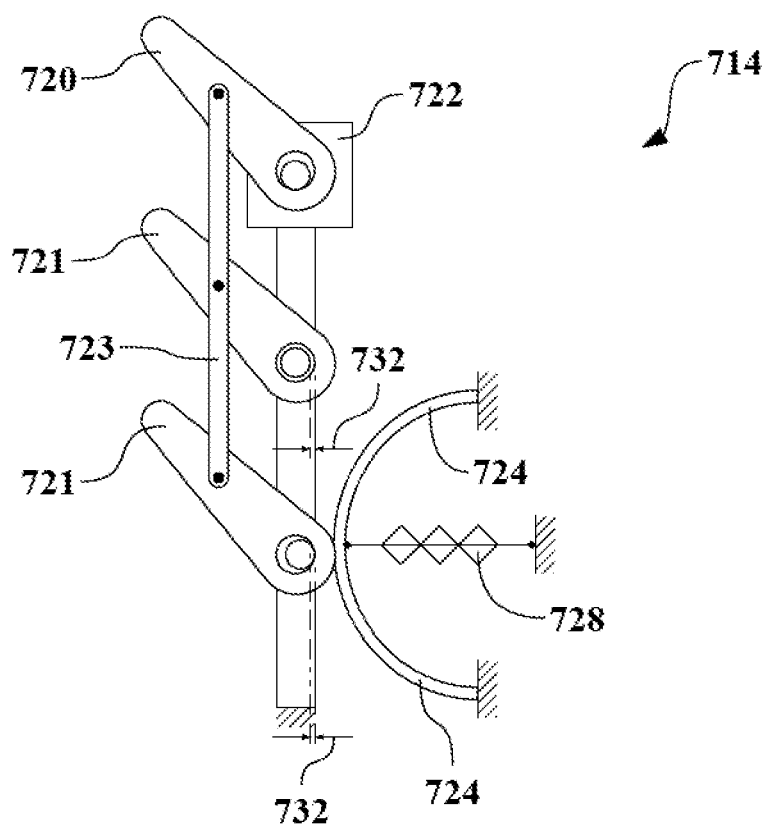
FIG. 7 is a schematic side view of a vane set being biased by a spring element to close a clearance gap.

Referring now to FIG. 7, and with continued reference to FIGS. 1-6, there is shown a schematic view of a shutter set 714 having a primary vane 720 and one or more secondary vanes 721. Features and components shown in other figures may be incorporated and used with those shown in FIG. 7.

The shutter set 714 shown in FIG. 7 includes a position actuator 722, which drives the primary vane 720. The position actuator 722 also drives the secondary vanes 721 through a link 723. The position actuator 722 may be a motor, or may be a solenoid or another actuator capable of positioning driving the primary vane 720 to one of an open, a closed, or an intermediate position. Alternatively, the position actuator may be operatively connected to, and configured to directly drive the link 723.

To account for manufacturing variability, the pivot points for the primary vane 720 and the secondary vanes 721 may be oversized by a predetermined clearance distance 732. The predetermined clearance distances 732 shown schematically in FIG. 7 may be exaggerated for illustrative purposes.

A vane stop 724 acts on at least one of the secondary vanes 721 or on the primary vane 720. The vane stop 724 is configured to bias one of the secondary vanes 721 by the predetermined clearance distance 732. The vane stop 724 applies the bias force that limits movement of the secondary vanes 721. The other secondary vanes 721 and the primary vane 720 may also, indirectly, be restrained by the link 723. The vane stop 724 therefore reduces the likelihood of the vibration or rattle in the secondary vanes 721 and the primary vane 720, particularly while in intermediate positions.

Although not required, the shutter set 714 may also include a vane stop actuator 728. The vane stop actuator 728 is configured to move or retract the vane stop 724 between a locking position (shown) and a free position (not shown, refracted to the right, as viewed in FIG. 7). The primary vane 720 and the secondary vanes 721 may be in the open position, closed position, or any intermediate position when the vane stop 724 is in the locking position.

When retracted to the free position by the vane stop actuator 728, the vane stop 724 applies reduced biasing force on the primary vane 720. Reducing the biasing force may reduce the friction on the secondary vanes 721 and allow movement and positioning of all of the vanes with relatively less effort from the position actuator 722.

Several of the figures focus on specific features or components of the invention. However, the features shown and described in relation to one figure may be combined with features shown and described in relation to the other figures, such that the invention may include a composition of features that is not wholly shown in any individual figure.

Note that although only some of the joints are shown with clearances in FIGS. 2-7, all of the joints in the respective systems may have clearances. The action of the respective vane stops is configured to reduce or eliminate all, or some, of these clearances. The vane stops are also configured to increase the stiffness of the systems as a whole and to increase frictional resistance to motion within the systems while the vane stop is in the locked position. The vane stops thus mitigate the causes of vibration, noise and harshness in the system.

When the vane stop is in the unlocked position, the inherent elasticity of the components of the system may restore some or all of the clearances and thereby reduce the stiffness of the system as well as the frictional resistance to the relative motion of its components. This allows the vanes to be repositioned with relative ease when the vane stop is in the unlocked position.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A shutter set comprising:
a first vane moveable between a first position and a second position;
a second vane moveable between a first position and a second position;
a first vane stop selectively moveable relative to the first vane between a locking position and a free position, wherein the first vane stop includes:
a first flexible connector configured to bias the first vane by a predetermined clearance distance when the first vane stop is in the locking position;
a second flexible connector configured to bias the second vane by the predetermined clearance distance when the first vane stop is in the locking position; and
wherein the first vane stop is configured not to bias the first vane when the first vane stop is in the free position and configured to allow movement of the first vane between the first position and the second position when the first vane stop is in the free position.

2. The shutter of claim 1, further comprising:
a third vane;
a fourth vane; and
a second vane stop selectively moveable between a locking position and a free position, wherein the second vane stop includes:
a third flexible connector configured to bias the third vane by the predetermined clearance distance when the second vane stop is in the locking position, and
a fourth flexible connector configured to bias the fourth vane by the predetermined clearance distance when the second vane stop is in the locking position.

3. The shutter of claim 2, further comprising:
a first actuator operatively attached to the first vane and second vane, and operatively attached to the second vane stop; and
a transmission, wherein the transmission is configured to selectively divide power from the first actuator to drive the first and second vanes between the first position and the second position, and also to drive the second vane stop between the locking position and the free position.

4. The shutter of claim 3, wherein the transmission is actuated by a shape-memory alloy.

5. The shutter of claim 3, wherein the transmission includes a Geneva mechanism, such that the Geneva mechanism divides power from the first actuator to drive the first and second vanes between the first position and the second position, and also drives the second vane stop between the locking position and the free position.

6. The shutter of claim 2, further comprising:
a first actuator operatively attached to the first vane and second vane, and operatively attached to the second vane stop, wherein the first actuator is configured to drive the first and second vanes between the first position and the second position, and configured to drive the second vane stop between the locking position and the free position; and
a second actuator operatively attached to the third vane and fourth vane, and operatively attached to the first vane stop, wherein the second actuator is configured to drive the third and fourth vanes between the first position and the second position, and configured to drive the first vane stop between the locking position and the free position.

7. The shutter of claim 6, further comprising:
a first energy storage mechanism operatively connected to the first actuator;
wherein the first actuator acts on the first energy storage mechanism, such that the first actuator controls movement of the first vane and the second vane stop; and
wherein the second actuator is directly connected to the second vane.

8. The shutter of claim 7,
wherein the first energy storage mechanism is disposed between the first actuator and the second vane stop; and
wherein the first actuator is directly connected to the first vane and the first vane is directly connected to the first energy storage mechanism.

9. The shutter of claim 7,
wherein the first energy storage mechanism is disposed between the first actuator and the first vane;
wherein the first actuator is directly connected to the second vane stop and the first vane is directly connected to the first energy storage mechanism; and
wherein first energy storage mechanism is configured to bias the first vane against the first vane stop.

10. The shutter of claim 1, further comprising:
a third vane;
a fourth vane;
a second vane stop selectively moveable between a locking position and a free position;
a first actuator operatively attached to the first vane and second vane, and operatively attached to the second vane stop, wherein the first actuator is configured to drive the first and second vanes between the first position and the second position, and configured to drive the second vane stop between the locking position and the free position; and
a second actuator operatively attached to the third vane and fourth vane, and operatively attached to the first vane stop, wherein the second actuator is configured to drive the third and fourth vanes between the first position and the second position, and configured to drive the first vane stop between the locking position and the free position.

11. The shutter of claim 10, further comprising:
a first energy storage mechanism operatively connected to the first actuator;
wherein the first actuator acts on the first energy storage mechanism, such that the first actuator controls movement of the first vane and the second vane stop; and
wherein the second actuator is directly connected to the second vane.

12. The shutter of claim 11,
wherein the first energy storage mechanism is disposed between the first actuator and the second vane stop; and
wherein the first actuator is directly connected to the first vane and the first vane is directly connected to the first energy storage mechanism.

13. The shutter of claim 11,
wherein the first energy storage mechanism is disposed between the first actuator and the first vane;
wherein the first actuator is directly connected to the second vane stop and the first vane is directly connected to the first energy storage mechanism; and
wherein first energy storage mechanism is configured to bias the first vane against the first vane stop.

14. A shutter set comprising:
a first vane set moveable between a first position and a second position;
a second vane set moveable between a first position and a second position; and
a vane stop selectively moveable relative to the second vane set between a locking position and a free position, wherein the vane stop is configured to apply a bias force to the second vane when the vane stop is in the locking position;
a first actuator operatively attached to the first vane set, and operatively attached to the vane stop, wherein the first actuator is configured to drive the first vane set between the first position and the second position, and is configured to drive the vane stop between the locking position and the free position; and
a second actuator directly connected to the second vane set and configured to drive the second vane set between the first position and the second position.

15. The shutter of claim 14, further comprising:
a first energy storage mechanism operatively connected to the first actuator; and
wherein the first actuator acts on the first energy storage mechanism, such that the first actuator controls movement of the first vane set and of the vane stop.

* * * * *